(12) United States Patent
Yoneda et al.

(10) Patent No.: US 8,074,397 B2
(45) Date of Patent: Dec. 13, 2011

(54) ILLUMINATOR FOR PLANT GROWTH

(75) Inventors: Kenji Yoneda, Kyoto (JP); Minoru Takahata, Minoo (JP); Takahiro Hayashi, Uji (JP)

(73) Assignee: CCS Inc., Kyoto (JP)

( * ) Notice: Subject to any disclaimer, the term of this patent is extended or adjusted under 35 U.S.C. 154(b) by 1238 days.

(21) Appl. No.: 10/203,620

(22) PCT Filed: Feb. 22, 2001

(86) PCT No.: PCT/JP01/01274
§ 371 (c)(1),
(2), (4) Date: Aug. 19, 2002

(87) PCT Pub. No.: WO01/62070
PCT Pub. Date: Aug. 30, 2001

(65) Prior Publication Data
US 2003/0009933 A1 Jan. 16, 2003

(30) Foreign Application Priority Data
Feb. 22, 2000 (JP) .................................. 2000-044919

(51) Int. Cl.
*A01G 29/00* (2006.01)

(52) U.S. Cl. .................... 47/58.1 LS; 47/17; 47/DIG. 6; 47/1.01 R

(58) Field of Classification Search ............... 47/1.01 R, 47/17, DIG. 6
See application file for complete search history.

(56) References Cited

U.S. PATENT DOCUMENTS

| | | | | |
|---|---|---|---|---|
| 3,703,051 A | * | 11/1972 | Weinberger | 47/58 |
| 3,931,695 A | * | 1/1976 | Widmayer | 47/58 |
| 4,063,387 A | * | 12/1977 | Mitchell | 47/67 |
| 4,396,872 A | * | 8/1983 | Nutter | 315/308 |
| 4,985,699 A | * | 1/1991 | Evans | 340/825.24 |
| 5,012,609 A | | 5/1991 | Ignatius et al. | |

(Continued)

FOREIGN PATENT DOCUMENTS

JP          5-115219         5/1993

(Continued)

OTHER PUBLICATIONS

Gardening: Muisc & Plants, Copyright 2000 FT Asia Intelligence Wire, The Statesman (India) Oct. 20, 2000, 2 pages.*

(Continued)

*Primary Examiner* — Andrea Valenti
(74) *Attorney, Agent, or Firm* — Kratz, Quintos & Hanson, LLP

(57) ABSTRACT

To provide an illuminator for plant growth that can illuminate a plant intermittently (pulse illumination) or continuously to cause an effect similar to sunbeam spot phenomenon, thereby accelerating photosynthetic reaction.

Specifically, the illuminator for plant growth includes a light source composed of a semiconductor optical device, a control unit for outputting a turn-on timing signal for the light source, a rhythm signal detecting unit for A/D converting an input rhythm signal, a timing signal modulating unit for modulating the turn-on timing signal with the output signal from the rhythm signal detecting unit, and a pulse drive unit for pulse-modulating a power signal with the modulated turn-on timing signal outputted from the timing signal modulating unit and supplying the pulse-modulated power signal to the light source.

2 Claims, 4 Drawing Sheets

U.S. PATENT DOCUMENTS

| | | | | | |
|---|---|---|---|---|---|
| 5,121,435 | A | * | 6/1992 | Chen | 381/56 |
| 5,568,311 | A | * | 10/1996 | Matsumoto | 359/344 |
| 5,860,248 | A | * | 1/1999 | Peters | 47/67 |
| 6,046,724 | A | * | 4/2000 | Hvass | 345/600 |
| 6,212,823 | B1 | * | 4/2001 | Oram et al. | 47/17 |
| 6,292,901 | B1 | * | 9/2001 | Lys et al. | 713/300 |

FOREIGN PATENT DOCUMENTS

| | | | |
|---|---|---|---|
| JP | 6-61184 | | 8/1994 |
| JP | 8-89084 | | 4/1996 |
| JP | 08-089084 | * | 4/1996 |
| JP | 8-103167 | | 4/1996 |
| JP | 09-275779 | * | 10/1997 |
| JP | 9-275779 | | 10/1997 |
| JP | 10-178899 | * | 7/1998 |
| JP | 11-289108 | * | 10/1999 |

OTHER PUBLICATIONS

IllumiNations, http://www.intercot.com/edc/IllumiNat, [retrieved from internet Feb. 4, 2004], 2 pages.*

English translation JP 08-089084 Apr. 2006.*

English translation JP 09-275779 Apr. 2006.*

English translation JP 11-289108 Apr. 2006.*

English translation JP 10-178899 Apr. 2006.*

Build this electronic controller and you can have your Christmas Lights Keep Time of Music, George J. Whalen et al, Popular Science, Dec. 1969, pp. 145, 146, 188.*

Retallack, Dorothy L.; The Sound of Music and Plants. DeVorss and Co.,California., c1973, 8 pages.*

* cited by examiner

# ILLUMINATOR FOR PLANT GROWTH

TECHNICAL FIELD

The present invention relates to an illuminator for plant growth that illuminates a plant with pulse light from a light emitting diode or continuous light with varying intensity to accelerate photosynthetic reaction, thereby activating the plant.

BACKGROUND ART

Recently, a factory plant growth system involving an artificial light source, which is unsusceptible to external factors including weather, climate and pest insects, has proceeded toward the practical use. The artificial light sources generally used include a high pressure sodium lamp, a low pressure sodium lamp, a xenon lamp, a metal halide lamp, a fluorescent lamp and a microwave lamp. Among of these, the high pressure sodium lamp, which has a relatively high luminous efficiency, is predominantly used.

However, in the artificial light source composed of the high pressure sodium lamp or the like, the balance between red light (having a wavelength region from 640 to 690 nm) and blue light (having a wavelength region from 420 to 470 nm), which is essential for photosynthesis phenomenon or the like, is not good, and therefore, the output thereof has to be increased significantly for wholesome plant growth. The low pressure sodium lamp has a higher luminous efficiency than the high pressure sodium lamp, but has a degraded light quality because it emits monochromatic light of sodium D line and is difficult to increase the output.

Such an artificial light source emits a high heat radiation and therefore has a significant load air-conditioning. In addition, the plant and the light source have to be sufficiently spaced apart from each other to prevent the plant from being affected by the heat radiation. Thus, there has been a problem in that the apparatus tends to be large.

In view of the problems, recently, the artificial light sources including a semiconductor optical device, such as a light emitting device (LED) and a semiconductor laser (LD), have been adopted. As for the semiconductor optical device, one having an emission wavelength region not including a heat ray can be adopted, so that the load of air-conditioning is reduced, and the whole apparatus can be made compact, so that the illumination efficiency is increased. Furthermore, the semiconductor optical device advantageously has a lifetime many times longer than that of the high pressure sodium lamp. In addition, since a lot of semiconductor optical devices are arranged in the form of a line or sheet, the configuration of the illuminator is readily and flexibly adapted to the plant to be illuminated, and the light emission density is readily controlled.

Another advantage of using the LED or LD is that intermittent illumination (pulse illumination) can readily provide the sunbeam spot phenomenon (intense sunshine filtering through foliage), which would occur in nature. During a short time when receiving the sunbeam spot, the plant stores the light energy in the form of a difference in proton concentration between inside and outside of the thylakoid statocyst of the chloroplast. Then, the light energy is used little by little to fix $CO_2$. The $CO_2$ absorption caused by the sunbeam spot is significantly higher than the $CO_2$ absorption (proportional to (photosynthetic rate)×(time duration of sunbeam spot)), which is estimated based on the photosynthetic rate in a steady state with a continuous and constant light intensity. The difference between the $CO_2$ absorptions becomes remarkable as the time duration of the sunbeam spot is reduced. That is, the efficiency of photosynthesis is higher when the plant is illuminated with the sunbeam spot for a short time than when it is continuously illuminated with light with a constant intensity.

DISCLOSURE OF THE INVENTION

It has been conventionally known that, as described above, a plant is illuminated intermittently by a pulse-oscillating semiconductor optical device to impart a bright period and a dark period to the plant in a balanced manner, thereby accelerating the plant growth. However, such an activation of the plant had a certain limit.

In view of such circumstances, an object of to be attained by this invention is to provide an illuminator for plant growth that illuminates a plant intermittently (pulse illumination) or illuminates the plant with continuous light varying in intensity to produce an effect similar to sunbeam spot phenomenon, thereby accelerating photosynthesis.

To attain the object, the inventors have earnestly pursued our studies focusing attention on the fact that if a plant is exposed to a rhythmic sound such as music, the photosynthetic reaction of the plant is accelerated, and finally have achieved the present invention.

Specifically, an illuminator for plant growth according to this invention is characterized in that it comprises a light source composed of a semiconductor optical device, modulates the light from the light source with a rhythm signal produced artificially or a rhythm signal extracted from sound present in nature, and illuminates a plant to be illuminated with the modulated light. Here, practically, the rhythm signal produced artificially is a rhythm signal extracted from a musical composition.

Furthermore, the illuminator for plant growth according to this invention is characterized in that the illuminator comprises a light source composed of a semiconductor optical device, a control unit for outputting a turn-on timing signal for the light source, a rhythm signal detecting unit for taking in an input rhythm signal, a timing signal modulating unit for modulating the turn-on timing signal with the output signal from the rhythm signal detecting unit, and a pulse drive unit for pulse-modulating a power signal with the modulated turn-on timing signal outputted from the timing signal modulating unit and supplying the pulse-modulated power signal to the light source, whereby the plant to be illuminated is pulse-illuminated while changing a light quantity of the light source in synchronization with the input rhythm signal.

Thus, a rhythm of a classical music number, prayer or the like is converted into pulse illumination light, which is applied to the plant to be illuminated. Therefore, the plant can be activated and growth thereof can be accelerated.

More specifically, the timing signal modulating unit preferably modulates the turn-on timing signal with the output signal from the rhythm signal detecting unit so as to change a pulse width or pulse cycle time of the power signal.

Alternatively, the illuminator for plant growth preferably further comprises a pulse height modulating unit for modulating an amplitude of the power signal supplied from the pulse drive unit to the light source with the output signal from the rhythm signal detecting unit, and a pulse height of pulsed light generated by the light source is modulated.

Furthermore, the light source desirably has a plurality of semiconductor optical devices having different emission wavelength regions. For example, the semiconductor optical devices, such as LEDs and LDs, include a plurality of types of devices having emission wavelength regions for providing red light, blue light and green light. Among others, the emission wavelength regions for providing the red light and the blue light substantially coincide with photosynthesis peaks (absorption peaks of chlorophyll). Thus, in order to mix the red light and the blue light in a well-balanced manner to raise the plant wholesomely and accelerate the growth thereof, a spectral ratio between red (R) and blue (B) (R/B ratio) is desirably set within a range from 1 to 10.

In addition, the plurality of semiconductor optical devices having different emission wavelength regions are preferably pulse-driven separately. Specifically, the control unit generates the turn-on timing signals for each of the semiconductor optical devices, the timing signal modulating unit modulates the turn-on timing signals with the output signal from the rhythm signal detecting unit for each of the semiconductor optical devices, and the pulse drive unit pulse-drives the semiconductor optical devices in the light source according to the respective output signals from the timing signal modulating unit.

Alternatively, a white light emitting diode is desirably used for the semiconductor optical device.

Furthermore, specifically, the timing signal modulating unit desirably multiplies the output signal from the rhythm signal detecting unit by the turn-on timing signal generated by the control unit to generate a signal synchronized with an amplitude of the rhythm signal, and sums the signal and the turn-on timing signal to modulate the turn-on timing signal.

Furthermore, in addition to the arrangement described above, the illuminator for plant growth according to this invention desirably comprises a sensor for monitoring a plant condition including a potential of the plant, and when the plant is to be pulse-illuminated, based on measurement data of the sensor, a dimming pattern for generating the turn-on timing signal is set for optimal activation of the plant, or switching among a plurality of dimming patterns previously stored is performed for optimal activation of the plant.

Furthermore, in addition to the arrangement described above, the illuminator for plant growth according to this invention desirably comprises various sensors for measuring environmental factors of the plant including atmospheric temperature, carbon dioxide concentration, and water temperature, and when the plant is to be pulse-illuminated, based on measurement data of the sensors, a dimming pattern for generating the turn-on timing signal is set for optimal activation of the plant, or switching among a plurality of dimming patterns previously stored is performed for optimal activation of the plant.

BEST MODE FOR CARRYING OUT THE INVENTION

Now, various embodiments of an illuminator for plant growth according to this invention will be described with reference to the drawings.

Figure 1:
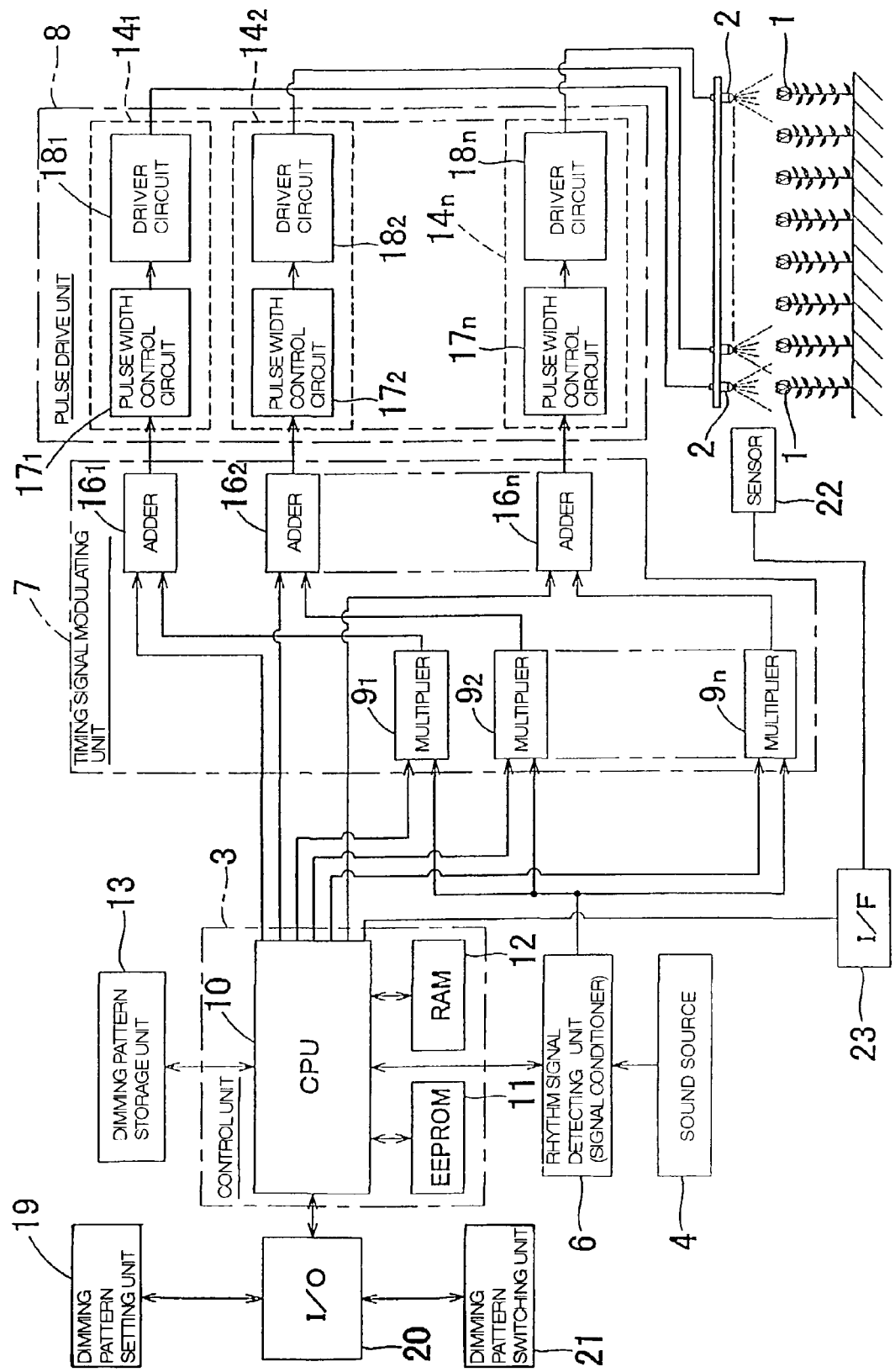
FIG. 1 is a schematic block diagram showing one embodiment of an illuminator for plant growth according to this invention.

FIG. 1 is a schematic block diagram showing one embodiment of the illuminator for plant growth according to this invention. The illuminator for plant growth according to this invention, which has a light source composed of a semiconductor optical device, modulates the light from the light source with a rhythm signal produced artificially or a rhythm signal extracted from sound present in nature, and illuminates a plant to be illuminated with the modulated light. The light source may be one emitting pulse light or continuous light. In the following description of the embodiments, the light source emitting pulse light will be primarily used.

As shown in FIG. 1, the illuminator for plant growth according to this embodiment, which pulse-illuminates (intermittently illuminates) plants to be illuminated 1, . . . , 1 by light emitters 2, . . . , 2 each having a semiconductor optical device, comprises a control unit 3 for generating a turn-on timing signal for the light emitters 2, . . . , 2, a sound source 4 for outputting a rhythm signal such as a music signal, a rhythm signal detecting unit (signal conditioner) 6 for taking in the output signal from the sound source 4, a timing signal modulating unit 7 for modulating the turn-on timing signal outputted from the control unit 3 with the output signal from the rhythm signal detecting unit 6, and a pulse drive unit 8 for pulse-driving the light emitters 2, . . . , 2 based on the modulated turn-on timing signal outputted from the timing signal modulating unit 7. In this embodiment, the timing signal modulating unit 6 is a piece of hardware. However, this invention is not limited thereto, and the timing signal modulating unit 6 may be incorporated in a control program processed in the control unit 3.

To avoid the strict safety standards for LDs (semiconductor laser), an LED is desirably used for the light emitter. In Japan, as the safety standards for LDs, safety classes (1, 2, 3A, 3B, 4) are defined in conformity to JIS C6802 (Radiation safety standards for laser products) in terms of affect on the human body. Other countries also impose strict restrictions on the LDs. For example, LD light with the wavelength of 680 nm is low in visibility, so that it is perceived not to be so bright by naked eyes. However, looking directly at a laser outgoing point is a very dangerous act, resulting in a hurt on the retina.

The light emitters 2, . . . , 2, which are composed of the semiconductor optical devices, may be those all having the same emission wavelength region or may be an assembly of semiconductor optical devices having different emission wavelength regions, such as of red light, blue light, green light and ultraviolet light. In particular, the red light (having a wavelength region from 640 to 690 nm) and the blue light (having a wavelength region from 420 to 470 nm) substantially coincide with peaks of photosynthesis (absorption peaks of chlorophyll), and thus, it is preferred that these two are mixed in a well-balanced manner for activating the plants. Besides, the ultraviolet light is known to limit the growth rate of the plant, and thus, the growth rate of the plant can be effectively controlled based on a dose of the ultraviolet light. Thus, the light emitters 2, . . . , 2 may include an ultraviolet light emitting device. Natural light, an ultraviolet lamp or the like may be used in conjunction with such illumination using the light emitters 2, . . . , 2. Alternatively, a white light emitting diode may desirably serve as the semiconductor optical device. In the white light emitting diode, some of blue light generated by a blue light emitting device is absorbed in a fluorescent material, and the original blue light and broadband light with a long wavelength radiated by the fluorescent material are mixed to generate white light. The white light emitting diode may be used in combination with the semiconductor optical devices having various emission wavelength regions, such as of red light, blue light, green light and ultraviolet light.

Figure 2:
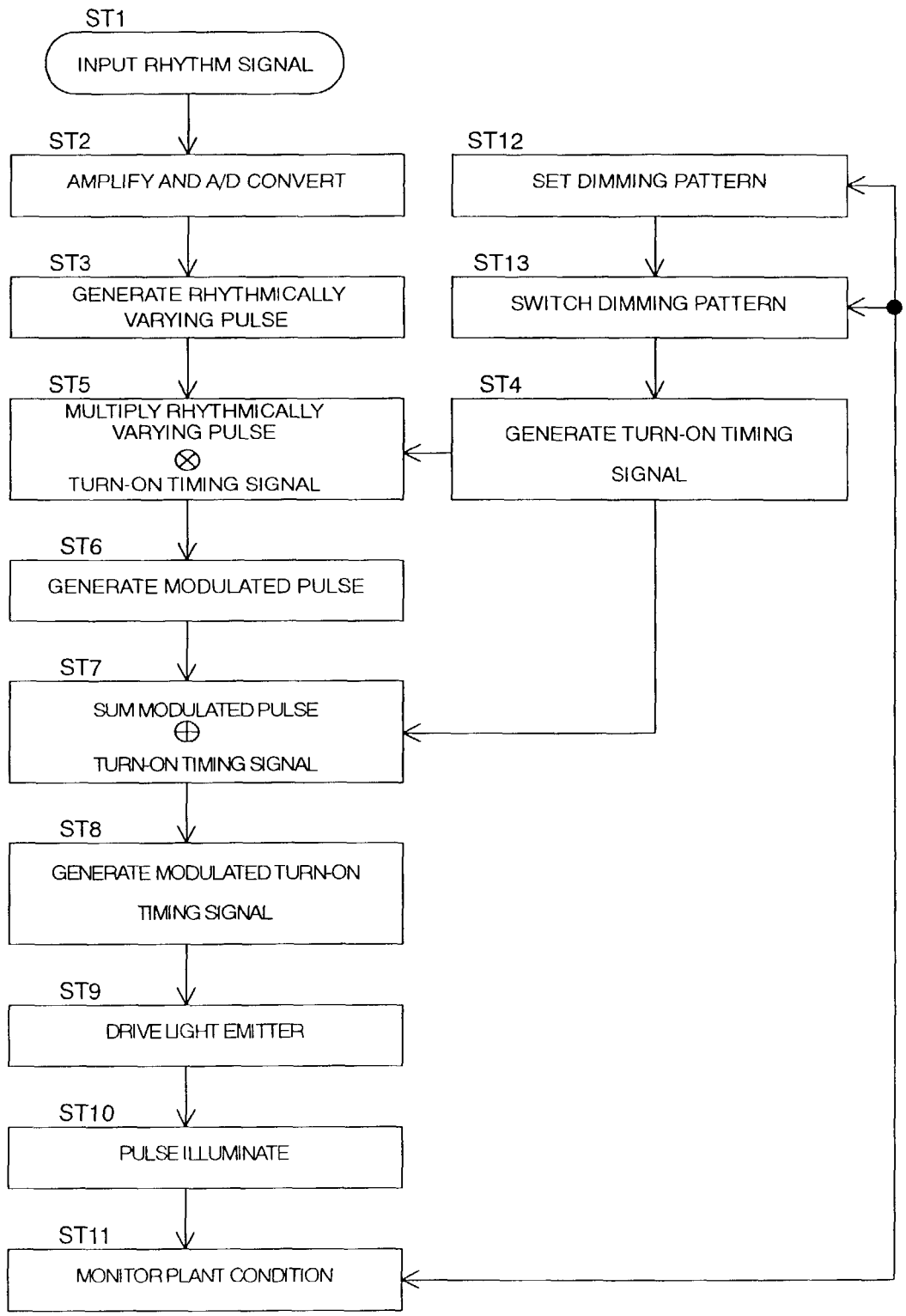
FIG. 2 is a flow chart illustrating process steps in units in the illuminator for plant growth according to this invention.

FIG. 2 is a flow chart illustrating process steps in units in the illuminator for plant growth according to this embodiment. Now, according to the flow chart shown in FIG. 2, the units in the illuminator for plant growth shown in FIG. 1 will be described in detail.

A rhythm signal outputted from the sound source 4 for generating rhythmic sound is inputted to the rhythm signal detecting unit 6 in the form of an analog waveform shown in FIG. 4(a) (ST1). A well-known sound-reproducing system may serve as the sound source 4. Here, the term "rhythm" used in this invention refers to sound length, pitch, stress or the like appearing according to a certain musical time or rule. For example, it refers to a pattern of sound produced in a musical composition or prayer, sound present in nature, such as a song of a bird and a murmur of a river, and in particular, sound pleasant for people.

Then, the rhythm signal detecting unit 6 amplifies and A/D converts the rhythm signal (ST2), generates a rhythmically varying pulse indicating an intensity of the rhythm signal (ST3), and outputs, in the form of serial data, the rhythmically varying signal to a multipliers $9_1, 9_2, \ldots, 9_n$ in the timing signal modulating unit 7.

On the other hand, the control unit 3, which comprises a CPU 10, a ROM (EEPROM) 11 that stores the control program and is rewritable and a RAM 12, generates the turn-on timing signals for drive circuits $14_1, \ldots, 14_n$ in a pulse drive unit 8 described later, respectively, by referring to dimming patterns of the light emitters stored in a dimming pattern storage unit 13, and transmits the turn-on timing signals to their respective multipliers $15_1, 15_2, \ldots, 15_n$ in the timing signal modulating unit 7 (ST4).

Referring to the illustration of FIG. 4 described in detail later, the turn-on timing signal outputted from the control unit 3 instructs the pulse drive unit 8 to produce a power signal (having a pulse cycle time T and a pulse width $t_R$) shown by (b-1) in FIG. 4, for example. The light quantity of the light emitter is determined by the pulse cycle time, the pulse width and a pulse amplitude. Desirably, the pulse cycle time is set at 2 μs-1 ms, and a duty cycle is set at 20-70%. Here, the duty cycle is defined as a ratio (t/T) of a pulse duration time t of pulse light to the pulse cycle time T, expressed as a percentage. In the pulse duration period $t_R$ (bright period), the light emitter emits light to cause a light reaction in the plant, and in the other period (dark period), the light emitter emits no light, so that the sunbeam spot effect can be brought about to increase the photosynthesis efficiency of the plant. It has been confirmed that, if a sufficiently long dark period is ensured by setting the pulse cycle time and duty cycle of the emitter as described above, no light saturation occurs even when the plant is illuminated with intense light, and the photosynthesis efficiency is increased compared with the case of illumination with continuous light. Such a phenomenon is more remarkable in a shade plant, such as an ornamental foliage plant, than in a sun plant, such as a rice plant. This is because the chloroplast of the shade plant has a remarkable characteristic that it stores protons in the thylakoid lumen when the sunbeam spot is applied thereto, and continues the ATP synthesis and $CO_2$ fixation for considerably long time after dark.

Then, each of the multipliers $9_1, 9_2, \ldots, 9_n$ in the timing signal modulating unit 7 multiplies the turn-on timing signal transmitted from the CPU 10 by the rhythmically varying pulse transmitted from the rhythm signal detecting unit 6 (ST5), and outputs the resulting modulated pulse to each of adders $16_1, 16_2, \ldots, 16_n$ (ST6). Then, each of the adders $16_1$, $16_2, \ldots, 16_n$ sums the modulated pulse and the turn-on timing signal (ST7) to generate a modulated turn-on timing signal (ST8).

Figure 4:
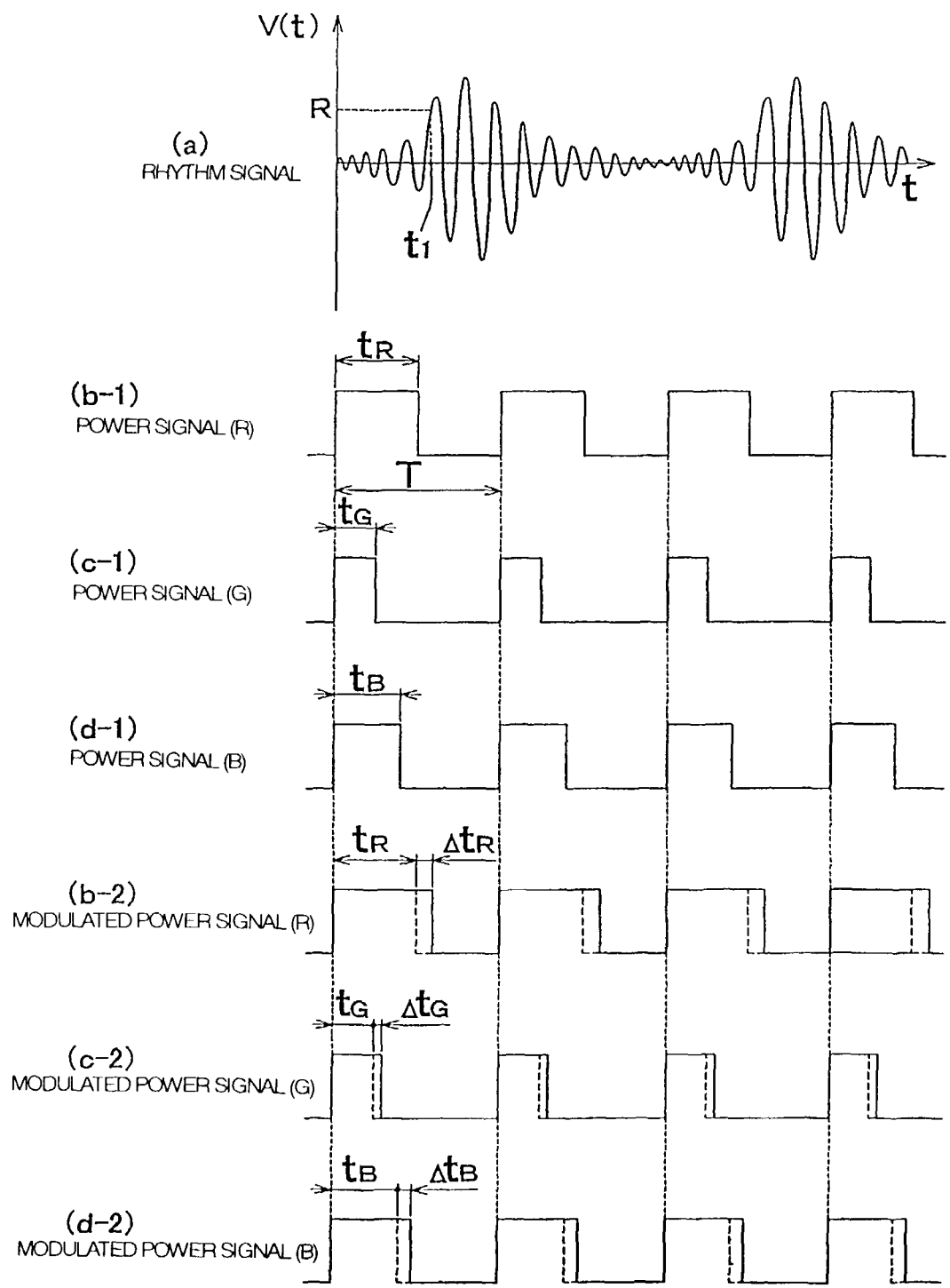
FIG. 4 schematically shows waveforms of an input rhythm signal and turn-on timing signals.

Referring to the illustration of FIG. 4, an amplitude R, at a time $t_1$, of the rhythm signal waveform shown by (a) in this drawing is digitized and simultaneously normalized in the rhythm signal detecting unit 6 and outputted as a rhythmically varying pulse indicating an amplitude R' (ST3). The multiplier $9_1$ multiplies the rhythmically varying pulse by the turn-on timing signal to generate a modulated pulse that determines a variation $\Delta t_R$ (=R'×$t_R$) of the pulse width of the power signal (ST6). Then, the adder $16_1$ sums the modulated pulse and the turn-on timing signal (ST7) and generates and outputs a modulated turn-on timing signal designating the pulse width of the power signal as $t_R+\Delta t_R$, as shown by (b-2) in FIG. 4 (ST8).

In the example described so far, the rhythm signal has the positive amplitude R. If the amplitude R of the rhythm signal is negative, the value $\Delta t_R$ is also negative, so that the pulse width of the power signal is reduced and the light quantity of the light emitter is also reduced.

Furthermore, in this embodiment, the timing signal modulating unit 7 modulates the turn-on timing signal with the rhythmically varying pulse to change the pulse width of the power signal. However, this invention is not limited to this embodiment, the turn-on timing signal may be modulated with the rhythmically varying pulse to change the amplitude or pulse cycle time of the power signal. Here, in the case of modulating a pulse height of the pulse light generated by the light source 2, a pulse height modulating unit (not shown) is preferably provided for modulating the amplitude of the power signal supplied from the pulse drive unit 8 to the light source (light emitter 2) with the output signal from the rhythm signal detecting unit 6.

Then, the modulated turn-on timing signals are inputted to the respective drive circuits $14_1, \ldots, 14_n$ in the pulse drive unit 8. Pulse width control circuits $17_1, 17_2, \ldots, 17_2$ each generate their PWM (Pulse Width Modulator) signals according to the respective turn-on timing signals. Then, having received the PWM signals, driver circuits $18_1, 18_2, \ldots, 18_n$ each drive power transistors or the like to supply the power signals having predetermined pulse cycle time, pulse width and amplitude to the light emitters 2, . . . , 2 to drive the light emitters (ST9). Thus, the plants 1, . . . , 1 are pulse-illuminated (ST10).

The dimming pattern for determining a dimming quantity of the light emitters 2, . . . , 2 (such as pulse cycle time, pulse width, amplitude and duty cycle) is set via a dimming pattern setting unit 19. The dimming value data is transmitted to the CPU 10 through an interface 20, and stored in storage regions in the dimming pattern storage unit 13. In addition, switching among the various dimming values can be performed in real time through a dimming pattern switching unit 21.

In addition, in the pulse illumination of the plant, a potential or the like of the plant can be measured by a sensor 22 as shown in FIG. 1, and the measurement data can be transmitted through an interface 23 to the CPU 10 and recognized by the CPU 10, whereby while monitoring the condition of the plant (ST11), the dimming pattern can be set by the dimming pattern setting unit 19 (ST12), or switching among the dimming patterns can be performed by the dimming pattern switching unit 21 (ST13).

In addition, it is desirable that a sensor for measuring environmental factors (atmospheric temperature, carbon dioxide concentration, water temperature or the like) of the plant is also provided, and dimming patterns for the environmental factors and plant conditions (potential or the like)

most suitable for activating the plant are previously stored in the dimming pattern storage unit 13 as a database. And, the CPU 10 refers to the database to retrieve the dimming pattern most useful for activating the plant based on the measurement data transmitted from the sensors, and generates the turn-on timing signal according to the dimming pattern in real time to pulse-drive the light emitters.

As described above, the pulse drive unit 8 has a plurality of drive circuits $14_1, 14_2, \ldots, 14_n$, and the control unit 3 generates the turn-on timing signals for each of the drive circuits. A set of a plurality of light emitters 2, ..., 2 constitutes a segment, and the drive circuits supply the pulsed power signals to their respective segments. For example, a plurality of boards each having the light emitters mounted thereon may be assembled three-dimensionally and the drive circuits may be provided for each of the boards, so that each board may constitute the segment. In this way, the illuminating angle, dose and the like of the light applied to the plant can be changed or adjusted stepwise. Furthermore, the light emitters may be divided into groups in terms of emission wavelength region or center emission wavelength, and each of the groups may constitute the segment.

Figure 3:
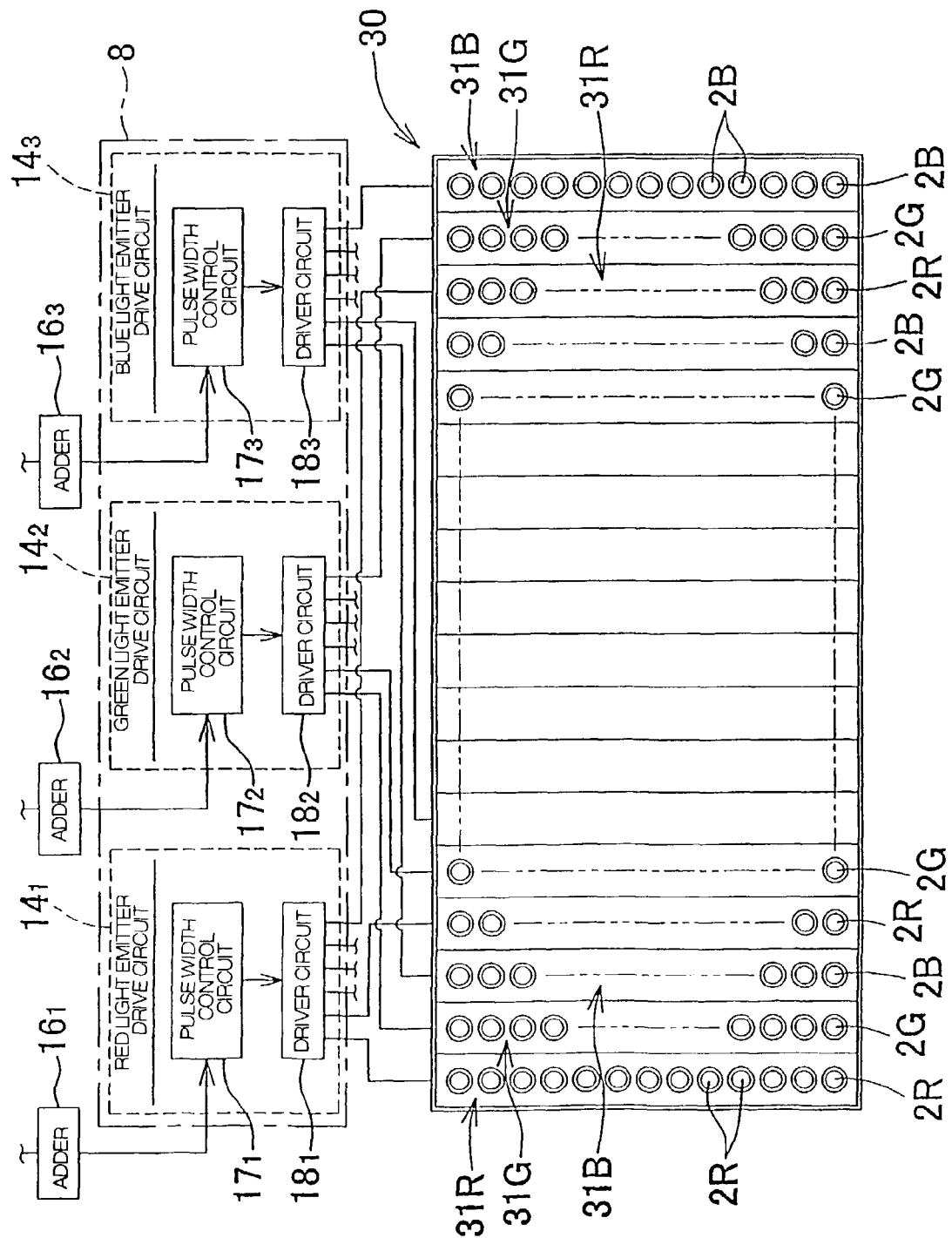
FIG. 3 is a schematic diagram showing one example of an illuminator panel and a pulse drive unit according to this invention.

With reference to FIG. 3, an example where the light emitters are divided, in terms of emission wavelength region, into groups each constituting the segment will be described in detail. FIG. 3 is a schematic diagram showing a illuminator panel 30 composed of red light emitters, green light emitters and blue light emitters different from each other in emission wavelength region and drive circuits $14_1$, $14_2$ and $14_3$. The drive circuits $14_1$, $14_2$ and $14_3$ are provided for the three types of light emitters, specifically, red light emitters, green light emitters and blue light emitters, respectively.

The illuminator panel 30 is composed of linear illuminator sections 31R, 31G, 31B sequentially arranged side by side, the linear illuminator sections 31R, 31G, 31B being composed of liner arrangements of the red light emitters 2R, ..., 2R, the green light emitters 2G, ..., 2G, the blue light emitters 2B, ..., 2B, respectively, and being interconnected in series. The red light emitter drive circuit $14_1$, the green light emitter drive circuit $14_2$ and the blue light emitter drive circuit $14_3$ drive the linear illuminator section 31R composed of the red light emitters, the linear illuminator section 31G composed of the green light emitters and the linear illuminator section 31B composed of the blue light emitters, respectively. While the linear illuminator sections 31R, 31G and 31B are equally arranged side by side in this embodiment, this invention is not limited thereto, and the number of the linear illuminator sections 31R may be increased to increase the red component in the illumination light.

That is, the control unit 3 transmits to the timing signal modulating unit 7 the turn-on timing signals capable of causing the drive circuits $14_1$, $14_2$ and $14_3$ to generate power signals (R), (G) and (B) having pulse cycle times shown by (b-1), (c-1) and (d-1) in FIG. 4, respectively. Here, the power signal (R) for the red light emitters has a pulse width $t_R$, the power signal (G) for the green light emitters has a pulse width $t_G$ and the power signal (B) for the blue light emitters has a pulse width $t_B$. For wholesome plant growth, it is desirable that, during the pulse illumination, the pulse widths $t_R$ and $t_B$ are determined so that a spectral ratio (R/B ratio) between the red light (R) and the blue light (B) falls within a range from 1 to 10, in particular, within a range in the vicinity of 10.

When the rhythm signal shown by (a) in FIG. 4 is inputted to the rhythm signal detecting unit 6, the rhythm signal is A/D converted and normalized, and then outputted to the timing signal modulating unit 7. Then, as described above, the modulated turn-on timing signals instruct the pulse drive unit 8 to generate the modulated power signals (R), (G) and (B) shown by (b-2), (c-2) and (d-2) in FIG. 4, respectively. That is, when the modulated turn-on timing signals are outputted to the red light emitter drive circuit $14_1$, the green light emitter drive circuit $14_2$ and the blue light emitter drive circuit $14_3$, in synchronization with an amplitude of the rhythm signal appearing at a certain point in time, the pulse width of the power signal (R) is changed to $t_R+\Delta t_R$, the pulse width of the power signal (G) is changed to $t_G+\Delta t_G$ and the pulse width of the power signal (B) is changed to $t_B+\Delta t_B$. In this way, with a variation in the rhythm signal, the variations of the pulse width $\Delta t_R$, $\Delta t_G$ and $\Delta t_B$ are varied, so that pulse-illumination of the plant in synchronization with the rhythm signal can be accomplished.

Furthermore, as described above, the light emitters may be divided into groups in terms of center emission wavelength region to constitute the segments, rather than in terms of emission wavelength region. For example, the red light emitting semiconductor optical device has the emission wavelength region approximately from 640 to 690 nm, and has a peak (center emission wavelength) in this wavelength region. However, the peak position varies with a little change in the structure of the semiconductor optical device. Thus, a plurality of light emitters having different center emission wavelengths may be prepared, so that when the photosynthesis peak of the plant varies with a variation in the environmental factors, a light emitter having the center emission wavelength suitable for the varied position of the photosynthesis peak can be selectively pulse-driven.

Preferably, the environmental factors of the plant, the potential of the plant or the like may be detected with a sensor, and a light emitter may be pulse-driven that is suitable for the photosynthesis peak varying with a variation in the environmental factors, plant potential or the like. Furthermore, it is desirable that photosynthesis peaks associated with the environmental factors, plant potential or the like are previously stored in the dimming pattern storage unit 13 as a database, and the control unit 3 having received the measurement value from the sensor 22 refers to the database to retrieve the optimal dimming pattern under the condition, and automatically generate the turn-on timing signal according to the dimming pattern.

Even when the semiconductor optical device changes its characteristics with a variation in temperature or the like and thus the center emission wavelength is shifted from the photosynthesis peak, the control unit 3, which has detected the shift of the center emission wavelength with the sensor and intends to restore the previous spectral distribution, can refer to the database stored in the dimming pattern storage unit 13 to generate the turn-on timing signal, thereby selectively pulse-driving another light emitter having the center emission wavelength suitable for the photosynthesis peak.

Besides, in the case of using a light source emitting continuous light, light varying in intensity, which is composed of a bias direct-current component and a sine wave component superimposed thereon, is used as the continuous light, and the frequency or amplitude of the sine wave is modulated with the rhythm signal.

An example in which a plant was raised in practical using the illuminator for plant growth according to this invention will be described below. The plant selected was African violet, and the semiconductor optical device used was the white LED. Here, the growth rate is a ratio of the total area of leaves after the experiment to the total area of leaves before the experiment, expressed as a percentage.

Comparative Example

Assuming that 24 hours constitute 1 cycle, the growth rate of the African violet after 14 cycles (2 weeks) was obtained.

Here, 1 cycle comprises 8 hours of illumination with the non-modulated pulsed light from the white LED with the frequency of 40 kHz and the duty cycle of 50% and the subsequent 16 hours of dark period with no light illumination. In this case, the growth rate of the African violet was 164.6%.

Example

Assuming that 24 hours constitute 1 cycle, the growth rate of the African violet after 14 cycles (2 weeks) was obtained. Here, 1 cycle comprises 8 hours of illuminating the plant with the pulsed light from the white LED with the frequency of 40 kHz and the duty cycle of 50% by modulating the turn-on timing thereof with the rhythm signal extracted from a musical composition and the subsequent 16 hours of dark period with no light illumination. Here, the musical composition used in this Example was the "Air on the G string" by Bach. The average light quantity was the same for the Comparative Example and this Example. In this case, the growth rate of the African violet was 193.8%.

TABLE

Result of experiment of raising plant

| | Area of leaves at start | Area of leaves after 2 weeks | Growth rate |
|---|---|---|---|
| Example | 6733 mm$^2$ | 13047 mm$^2$ | 193.8% |
| Comparative Example | 7050 mm$^2$ | 11602 mm$^2$ | 164.6% |

Notes:
mean values for two plants both in Example and Comparative Example

From the Comparative Example and the Example, it was confirmed that the growth rate of the African violet was increased by 18% in the case of illuminating the plant by pulse-modulating the turn-on timing of the pulsed light from the white LED, compared to the case of illuminating the same without the pulse modulation. Besides, it has been confirmed by another experiment that continuous light from the white LED provides a higher plant growth rate than the light from a fluorescent lamp, and the pulsed light from the white LED provides a higher plant growth rate than the continuous light from the white LED within the ranges of the frequency from 1 to 500 kHz (cycle time from 2 µs to 1 ms) and the duty cycle from 20 to 70%.

INDUSTRIAL APPLICABILITY

The illuminator for plant growth according to this invention has a light source composed of a semiconductor optical device, modulates the light from the light source with a rhythm signal produced artificially or a rhythm signal extracted from sound present in nature, and illuminates a plant to be illuminated with the modulated light, whereby growth of the plant can be accelerated.

Specifically, the illuminator for plant growth comprises a light source composed of a semiconductor optical device, a control unit for outputting a turn-on timing signal for the light source, a rhythm signal detecting unit for taking in an input rhythm signal, a timing signal modulating unit for modulating the turn-on timing signal with the output signal from the rhythm signal detecting unit, and a pulse drive unit for pulse-modulating a power signal with the modulated turn-on timing signal outputted from the timing signal modulating unit and supplying the pulse-modulated power signal to the light source. Thus, the plant to be illuminated is pulse-illuminated while changing the light quantity of the light source in synchronization with the input rhythm signal. Therefore, various rhythms extracted from a musical composition, prayer or the like can be converted into pulse illumination light, which can be applied to the plant for activation, thereby remarkably accelerating the growth of the plant.

The invention claimed is:

1. An illumination method for plant growth, comprising steps of:
providing a light source composed of a semiconductor optical device;
modulating light generated by the light source with a rhythm signal extracted from a musical composition produced artificially, and
illuminating a plant to be illuminated with the modulated light;
wherein said rhythm signal produced artificially indicates sound length, pitch or stress according to a certain musical time or rule;
wherein the light source is comprised in an illuminator composed of a semiconductor optical device, and which comprises a control unit for outputting a turn-on timing signal for the light source, a rhythm signal detecting unit for taking in an input rhythm signal, a timing signal modulating unit for modulating said turn-on timing signal with the output signal from the rhythm signal detecting unit, and a pulse drive unit for pulse-modulating a power signal with the modulated turn-on timing signal outputted from the timing signal modulating unit and supplying the pulse-modulated power signal to said light source, whereby the plant to be illuminated is pulse-illuminated while changing a light quantity of the light source in synchronization with said input rhythm signal;
wherein said timing signal modulating unit multiplies the output signal from said rhythm signal detecting unit by the turn-on timing signal generated by said control unit to generate a signal synchronized with an amplitude of the rhythm signal, and sums the signal and said turn-on timing signal to modulate said turn-on timing signal.

2. An illumination method for plant growth, comprising steps of:
providing a light source composed of a semiconductor optical device;
modulating light generated by the light source with a rhythm signal extracted from a musical composition produced artificially, and
illuminating a plant to be illuminated with the modulated light;
wherein said rhythm signal produced artificially indicates sound length, pitch or stress according to a certain musical time or rule;
further comprising providing various sensors for measuring environmental factors of the plant including atmospheric temperature, carbon dioxide concentration, and water temperature and when the plant is to be pulse-illuminated, based on measurement data of the sensors, setting a dimming pattern for generating said turn-on timing signal for optimal activation of the plant, or performing switching among a plurality of dimming patterns previously stored for optimal activation of the plant.

* * * * *